US010880474B1

(12) United States Patent
Thomas et al.

(10) Patent No.: US 10,880,474 B1
(45) Date of Patent: Dec. 29, 2020

(54) SYSTEMS AND METHODS FOR MOBILE IMAGING (71) Applicant: SURVEYING AND MAPPING, LLC, Austin, TX (US)

(72) Inventors: Matthew Eric Thomas, Austin, TX (US); Adam William Long, Dripping Springs, TX (US)

(*) Notice: Subject to any disclaimer, the term of this patent is extended or adjusted under 35 U.S.C. 154(b) by 378 days.

(21) Appl. No.: 15/276,606

(22) Filed: Sep. 26, 2016

Related U.S. Application Data (60) Provisional application No. 62/232,107, filed on Sep. 24, 2015.

(51) Int. Cl.
| *H04N 5/232* | (2006.01) |
| *G01S 19/13* | (2010.01) |
| *H04N 7/18* | (2006.01) |
| *H04N 5/247* | (2006.01) |
| *H04N 5/04* | (2006.01) |
| *G06T 7/00* | (2017.01) |
| *B60R 11/04* | (2006.01) |

(52) U.S. Cl.
CPC ........ *H04N 5/23238* (2013.01); *B60R 11/04* (2013.01); *G01S 19/13* (2013.01); *G06T 7/0018* (2013.01); *G06T 7/0026* (2013.01); *H04N 5/04* (2013.01); *H04N 5/247* (2013.01); *H04N 7/181* (2013.01); *G06T 2207/30252* (2013.01)

(58) Field of Classification Search
USPC .......................................................... 348/38
See application file for complete search history.

(56) References Cited

U.S. PATENT DOCUMENTS

| 5,367,341 A * | 11/1994 | Schnorf | G11B 27/029 348/616 |
| 5,633,946 A | 5/1997 | Lachinski et al. | |
| 5,913,078 A * | 6/1999 | Kimura | G01S 19/235 396/310 |
| 2008/0117287 A1* | 5/2008 | Park | H04N 7/18 348/36 |
| 2009/0222432 A1* | 9/2009 | Ratnakar | G06F 17/30265 |

(Continued)

OTHER PUBLICATIONS

You Tube, Engadget, GoPro unveils a 360-degree camera array for VR videos, 13 pages May 28, 2015.

*Primary Examiner* — James M Anderson, II
(74) *Attorney, Agent, or Firm* — Jackson Walker LLP (57) ABSTRACT Various systems and processes may achieve mobile imaging. In particular implementations, systems and processes for mobile imaging may include the ability to capture video data with a number of video cameras mounted on a vehicle, determine positioning information as the cameras capture video data, and place audio marks in the video data of each camera. Each camera may be positioned to obtain a different view relative to the vehicle and adapted to capture video data as the vehicle travels. The positioning information may, for example, be derived from a global positioning system transceiver. The audio marks may be generated a number of times as the vehicle travels, and the time for each activation logged. The captured video data from each camera may be synchronized based on the audio marks and then combined to generate a 360 degree video, as well as related images, which may be correlated with map locations.

22 Claims, 9 Drawing Sheets

(56) References Cited

U.S. PATENT DOCUMENTS

| | | | | |
|---|---|---|---|---|
| 2011/0313617 | A1* | 12/2011 | Omote | B60Q 5/008 |
| | | | | 701/36 |
| 2013/0278715 | A1* | 10/2013 | Nutsch | H04N 5/23238 |
| | | | | 348/38 |
| 2014/0184799 | A1* | 7/2014 | Kussel | G01B 11/272 |
| | | | | 348/148 |
| 2015/0098021 | A1* | 4/2015 | O'Sullivan | H04N 5/04 |
| | | | | 348/516 |
| 2015/0304559 | A1* | 10/2015 | Glasse | H04N 5/23238 |
| | | | | 348/38 |
| 2016/0336020 | A1* | 11/2016 | Bradlow | G01S 19/49 |
| 2017/0053674 | A1* | 2/2017 | Fisher | H04N 21/84 |
| 2018/0127006 | A1* | 5/2018 | Wade | B61L 27/0088 |

* cited by examiner

SYSTEMS AND METHODS FOR MOBILE IMAGING

RELATED APPLICATIONS

This application claims priority to U.S. Patent Application No. 62/232,107, which was filed on Sep. 24, 2015. The prior application is herein incorporated by reference in its entirety.

BACKGROUND

Image stitching is the process of combining multiple photographic images with overlapping fields of view to produce a segmented panorama or high-resolution image. Commonly performed through the use of computer software, most approaches to image stitching require nearly exact overlaps between images and identical exposures to produce seamless results. Image stitching is widely used in today's world in applications such as image stabilization in camcorders, which use frame-rate image alignment, high resolution photo mosaics in digital maps and satellite photos, medical imaging, multiple image super-resolution, and object insertion.

Image stitching becomes more problematic when there are translational differences between the reference points of the frames to be stitched together and/or when there are a series of images to be stitched together, especially when they are from different cameras, which may have different exposures and points of view. These problems can become even more pronounced when the cameras capturing the images do not have accurate timing relative to each other. For a moving platform (e.g., a vehicle) with multiple cameras having different timings relative to each other, for example, it may be difficult to determine which frames from the cameras are best associated with a particular location being imaged.

DETAILED DESCRIPTION

Figure 1:
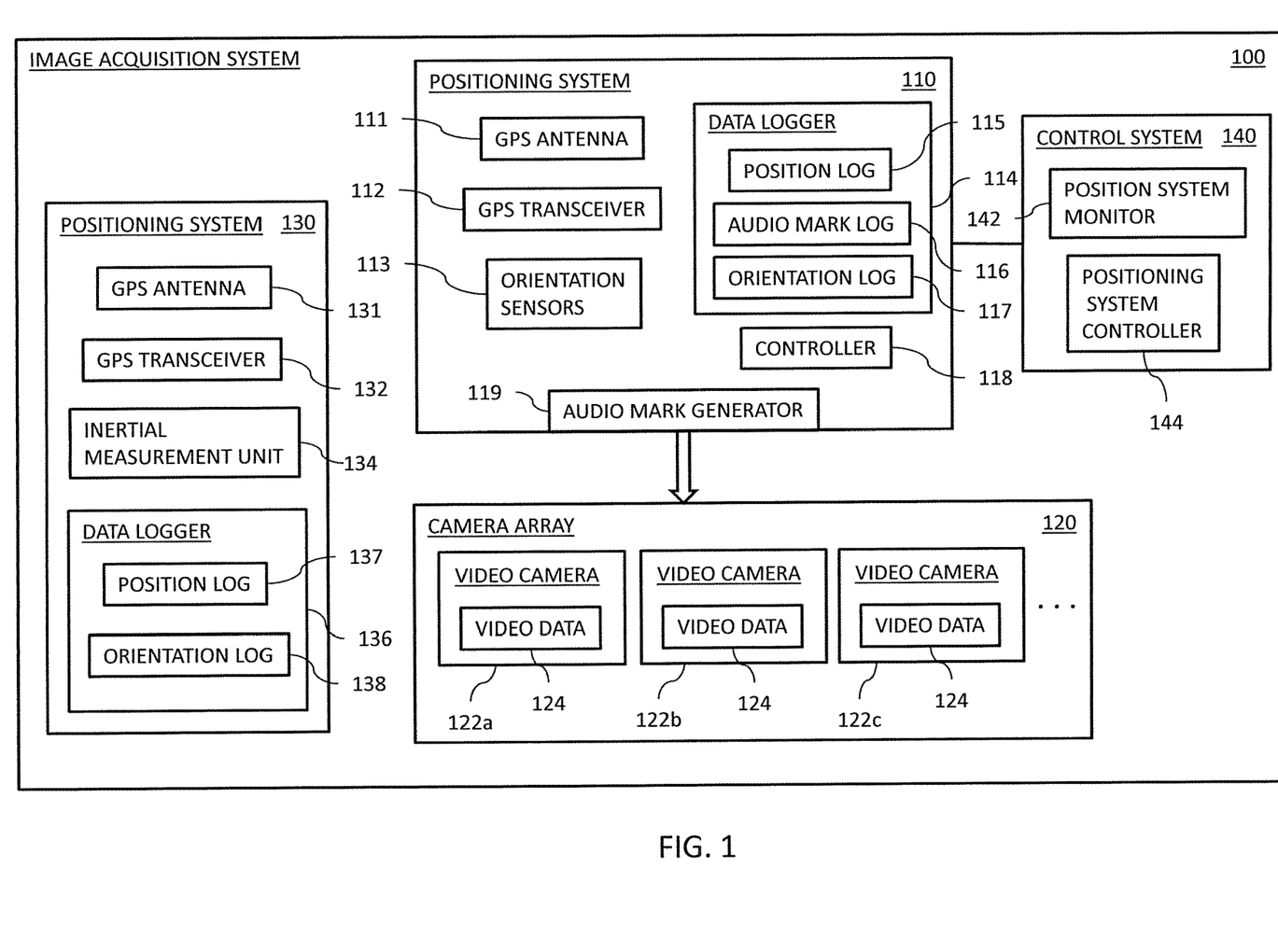
FIG. 1 is a block diagram illustrating selected components of an example image acquisition system for mobile imaging.

FIG. 1 illustrates selected components of an example image acquisition system 100 for mobile imaging. Image acquisition system 100 is designed to be installed on a vehicle (e.g., a car, a truck, a sport utility vehicle, a train, a boat, a helicopter, an unmanned aerial vehicle, or an airplane), the movement of the underlying vehicle causing the image acquisition system to be move. At a high level, image acquisition system 100 includes a first positioning system 110, a camera array 120, a second positioning system 130, and a control system 140.

Camera array 120 includes a number of video cameras 122. Camera array 120 may, for example, include 4-8 video cameras 122. In particular implementations, video cameras 122 may be mounted around a normal to a horizontal plane so that they provide 360 degree coverage in the horizontal. The field of views (FOVs) of the cameras may overlap (e.g., 15-30%) to reduce lens distortion and provide detectable features. In certain implementations, one or more video cameras 122 may be mounted at an acute angle to the horizontal plane to provide coverage above and/or below the other cameras.

Video cameras 122 may record video data 124 (e.g., imagery and audio) at any of a variety of resolutions and frame rates. For example, in certain implementations, video cameras 122 may record imagery at 1080P or 4K resolution. The frame rate at 1080P may, for example, be 60 FPS, and the frame rate at 4K may be 15 FPS. Additionally, the video cameras may use an auto-shutter feature so that the images are corrected for light/dark transitions (e.g., when passing under underpasses or through tunnels). Video cameras 122 may, for example, be Hero3+ Black cameras or Hero 4 Black cameras from GoPro, Inc.

Positioning system 110 determines the position of the image acquisition system 100. Positioning system 110 may, for example, use Global Positioning System (GPS) technology and inertial measurements (e.g., through gyroscopes) to determine position. Positioning system 110 may also provide orientation measurements (e.g., roll, pitch, and yaw).

In the illustrated implementation, positioning system 110 includes a GPS antenna 111, a GPS transceiver 112, orientation sensors 113, a data logger 114, a controller 118, and an audio mark generator 119. Data logger 114 includes a position log 115, an audio mark log 116, and an orientation log 117. GPS antenna 111 and GPS transceiver 112 may operate according to well-known principles. The positions and times determined by GPS transceiver 112 may be stored in position log 113. Positioning system 110 may, for example, be a GPS-enabled PixHawk, which is available from 3D Robotics of Berkeley, Calif. (USA).

Orientation sensors 113 may determine the orientation of the image acquisition system (e.g., roll, pitch, and yaw) by any appropriate technique (e.g., gyroscopes or electronic accelerometers). The orientations determined by orientation sensors 113 are stored in orientation log 117. In particular implementations, the positions and the orientations may be stored together in the same log.

Controller 118 is adapted to manage the various components of positioning system 110. Controller 118 may, for example, be a computer system, with one or more processors, memory, and interface devices.

As part of its functions, controller 118 may command the generation of an audio mark that will be recorded (in analog or digital format) in the video data of video cameras 122. The audio mark is generated as an audio signal, which may be an actual audible sound or an electrical representation of an audible sound (in an analog or digital format). In the illustrated implementation, a command signal is supplied to audio mark generator 119, which generates an audio signal based on the command. In certain implementations, audio mark generator 119 may, for example, include a buzzer, a bell, a speaker, or any other suitable device for generating an audible sound. In some implementations, audio mark generator may be a sound card that generates an electrical signal representing an audible sound. The electrical signal may be fed directly into each video camera 122. The times at which the audio marks are commanded are stored in audio mark log 116.

Data logger 114 may, for example, include a computer writable/readable memory (e.g., a hard drive, a flash drive, etc.). In particular implementations, the positions, audio mark times, and/or the orientations may be stored together in the same log.

Positioning system 130 may, for example, use a combination of GPS technology and inertial measurements to determine position. Positioning system 130 may also provide orientation measurements (e.g., roll, pitch, and yaw).

In the illustrated implementations, positioning system 130 includes a GPS antenna 131, a GPS transceiver 132, an inertial measurement unit 134, and a data logger 136. GPS antenna 131 and GPS transceiver 132 may operate according to well-known principles. Inertial measurement unit 134 provides spatial positions (x, y, and z) as well as orientation (r, p, and y). Inertial measurement unit 134 may, for example, include a number of gyroscopes to perform the measurements. Suitable inertial measurement units are available from Applanix Corporation of Richmond Hill, Ontario (Canada). In particular implementations, positioning system 130 may be a Mobile Mapping System from Optech Incorporated of Vaughan, Ontario (Canada).

In certain implementations, the spatial positions provided by inertial measurement unit 134 may be updated periodically based on the position determinations performed by GPS transceiver 132. For example, GPS transceiver 132 may generate position determinations at a rate of 2 Hz, while inertial measurement unit 134 may generate position determinations at a rate of 200 Hz. Thus, the position of the inertial measurement unit may update at a rate of up to 2 Hz. Additionally, the inertial measurement unit 134 may provide position determinations between the 2 Hz GPS position determinations.

Data logger 136 includes a position log 137 and an orientation log 138. Position log 137 may include position determinations made by GPS transceiver 132 and/or inertial measurement unit 134, along with associated times. Orientation log 138 may include orientation determinations made by inertial measurement unit 134. Data logger 136 may, for example, include a computer writable/readable memory (e.g., a hard drive, a flash drive, etc.). In particular implementations, the positions and the orientations 138 may be stored together in the same log.

Control system 140 is responsible for controlling positioning system 110. Control system 140 may, for example, be a personal computer, a laptop computer, a workstation, a tablet, a smart phone, or any other appropriate computational device for communicating with positioning system 110. Control system 140 includes a positioning system monitor 142 and a positioning system controller 144. Positioning system monitor 142 is able to display parameters from positioning system 110, including operational parameters and the position of the positioning system 110. Positioning system monitor 142 may, for example, be a liquid crystal display, a light-emitting diode display, or a projector. Positioning system controller 144 may, for example, be a computer system, with one or more processors, memory, and interface devices. Controller 144 is able to control positioning system 110. For example, positioning system controller 144 may instruct the positioning system 110 regarding when to begin logging measurements, to generate audio marks, and when to generate audio marks (e.g., based on distance or time).

In particular modes of operation, system 100 may be used by instructing positioning system 110 and positioning system 130 to begin logging positions and orientations. (Times are also logged along with the positions and orientations.) Positioning system 110 and positioning system 130 may produce position determinations at differing rates and times. For example, positioning system 110 may generate positions at a rate of 10 Hz, while positioning system 130 may generate positions at a rate of 200 Hz. After making sure that the positioning systems are functioning properly, cameras 122 in camera array 120 may be activated. A number (e.g., 1-10) of audio marks may then be generated by audio mark generator 119 (under the control of controller 118). These audio marks are recorded on the audio track of the video data for each video camera 122. Controller 118 also inserts an entry in audio mark log 114 for each audio mark, indicating that an audio mark was generated at a particular time. The audio marks may be generated manually, under instruction from control system 140, or in an automated fashion (e.g., based on movement of the vehicle).

The vehicle may then begin moving along its route. For instance, if the vehicle is mapping a roadway, it may be a truck. The truck may generally move along the roadway at typical speeds (e.g., 30-60 mph), although it may stop if it needs to (e.g., for traffic, at stop lights, etc.).

As the vehicle moves (or stops), video cameras 122 continue recording video images and audio and storing it as video data 124. Additionally, controller 118 of positioning system 110 may determine whether an additional audio mark should be generated. For example, an audio mark may be generated when the vehicle has moved a predesignated distance (e.g., 1000 m) or when a predesignated time has elapsed (e.g., 1 minute). These parameters may be input through control system 140. If an additional audio mark should be generated, controller 118 may wait for a time at which GPS transceiver 112 is determining a GPS position and send a command to audio mark generator 119 at that time. This will allow the audio marks to closely correspond to a precise time. Audio mark generator 119 may generate an audio signal based on a command signal from controller 118, and the audio signal will be captured by video cameras 122 and stored in their video data 124. Controller 118 may also insert an entry in audio mark log 116 indicating that an audio mark was generated at a particular time.

The recording of the video data will continue until the video acquisition is complete (e.g., at the end of the section of roadway being imaged). This may, for example, be based on a geographic distance that the video data is to cover, which may be controlled by controller 118 or input through control system 140. Thus, the amount of video data and the number of audio marks generated may vary with how long video is recorded.

When the video acquisition is complete, the video cameras may be stopped, and the logging of the positions and orientations may cease. The vehicle may continue moving (e.g., to return to its home base) or stop (e.g., to determine its next imaging route).

In certain implementations, a number of audio signals (e.g., 1-10) may be generated by the audio mark generator (under the control of controller 118) at the end of a route. These audio signals are also recorded on the audio track of the video data for each camera 122. Corresponding entries are also placed in audio mark log 114 for the audio marks.

The frames from the various video cameras may be synchronized by aligning audio marks on each audio track. In particular implementations, the frames between two video cameras may not exactly align (e.g., if the cameras started recording video at slightly different times). However, if the frame rate is sufficiently high, the frames may be close enough so that there is not a large degradation in the imaging. For example, if the cameras record video at a rate of 20 frames per second, there should be at most an offset of 0.025 seconds between frames of two cameras. This would translate to an offset of about 1.7 feet if the vehicle was traveling at 45 mph. This offset should be able to be accounted for when the videos are integrated.

Once the frames are synchronized, frames that are associated with each other (e.g., in time) may be integrated. In particular implementations, integrating a set of associated frames may include for correcting the orientation of each frame with respect to adjacent frames. Correcting the orientation may, for example, be accomplished by accessing an orientation log to adjust the orientation of each frame with respect to its neighboring frames. Integrating a set of associated frames may also include integrating the frames together. Integrating the frames may, for example, be accomplished by image registration, image calibration, and image blending of the frames, which will be discussed in more detail below. A set of integrated frames may provide a panoramic image. A sequential series of integrated frames may provide a 360 degree video. The panoramic images may, for example, be generated based on specific time or location criteria (e.g., every second or every 100 ft.).

The 360 degree video, the images, and/or the panoramic images may be correlated with map locations. Because at least some of the frames are associated with times due to the audio marks, the frames may be correlated with positions from the position log. In certain implementations, the position log may have positions sampled at a higher rate than the video frames (e.g., 200 Hz versus 20 Hz). Thus, each frame may be directly associated with a unique position, assuming the vehicle did not stop. In other implementations, the position log may have positions sampled at a lower rate than the video frames (e.g., 2 Hz versus 30 Hz). The positions of frames that occur between position measurements may be interpolated.

Figure 2:
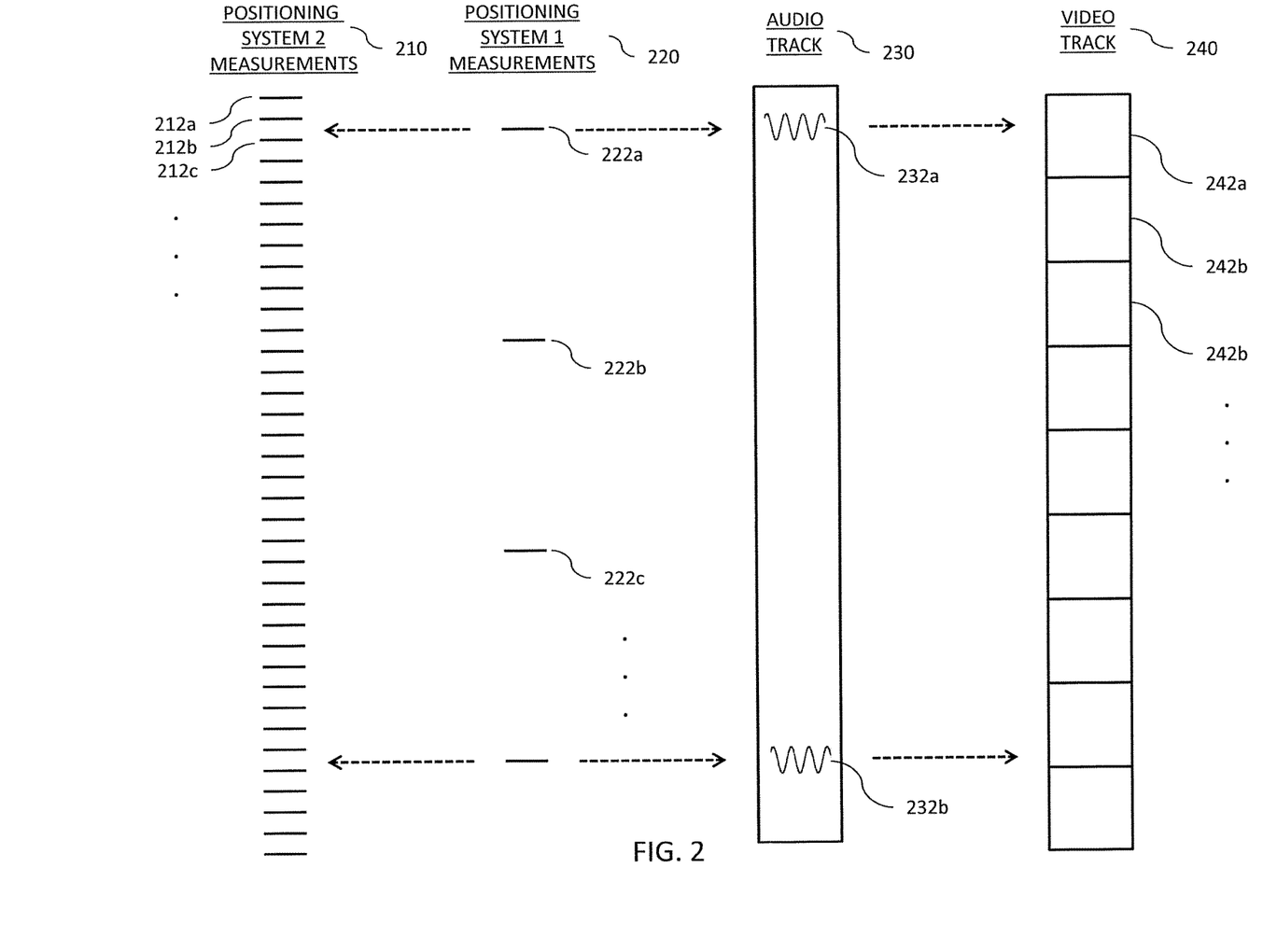
FIG. 2 is a timing diagram illustrating selected operations of an example image acquisition system for mobile imaging.

FIG. 2 illustrates example timing correlations between the measurements of two positioning systems, an audio track 230 of a video camera, and a video track 240 of the video camera. For example, assume that a first positioning system is generating measurements 220 at a rate of 10 Hz. Thus, video frames 242 of video track 240 are being produced at a rate of 25 Hz, and the second positioning system is generating measurements 210 at a rate of 100 Hz.

As can be seen, audio track 230 includes a number of audio marks 232, which were generated during an image collection. In the illustrated implementation, audio marks 232 correspond closely with particular measurements 222. This, may, for example, be accomplished by activating an audio mark generator when the first positioning system is generating a measurement. The measurements 222 may have a time associated with them.

Each audio mark 232 is also associated with a frame 242 in video track 240. Because audio is typically sampled at a rate much higher than video frames are generated (e.g., 40,000 Hz versus 20 Hz), an audio mark 232 on the audio track 230 may be directly associated with a frame 242.

As illustrated, particular measurements 222 in positioning system measurements 220 may not correspond exactly to particular measurements 212 in positioning system measurements 210. If the measurement rate for measurements 210 is sufficiently high (e.g., five times higher than that of positioning system measurements 220), the corresponding frame may be associated with the closest positioning system measurement 210. If, however, the measurements 210 do not have a sufficiently high rate, the corresponding frame may be assigned a position that is interpolated between the two closest measurements.

Thus, although the frames 242 may originally be associated with measurements from the first positioning system due to the audio marks, the frames may also be associated with measurements from the second positioning system. This may, for example, be useful when the second positioning system has better accuracy. The first positioning system therefore serves to provide secondary positions, aid in synchronization of video cameras, and as a timing device to link the video frames to the second positioning system.

System 100 has a variety of features. For example, it allows imaging from multiple cameras to be synchronized. Many prior art cameras have poor absolute timing, making it difficult to synchronize their imaging with each other based on their timing alone, especially when there are multiple cameras onboard a moving platform that must be synchronized. By being able to collect and synchronize images with a number of video cameras, 360 degree views of a geographic area (i.e., a section of roadway) may be collected and a 360 degree video and/or panoramic images generated. Additionally, by being able to associate their data with positioning system measurements, the video may be adjusted for orientation differences and may be tied to map locations. In certain implementations, the positions associated with the video may be accurate to +/−10 cm.

Although FIG. 1 illustrates one example image acquisition system for mobile imaging, other image acquisition systems for mobile imaging may include fewer, additional, and/or a different arrangement of components. For example, some systems may not include positioning system 130. In these systems, the positions associated with the video frames may be generated based on position log 115. If positioning system 110 does not generate positions measurements at a fast enough rate, the positions for the frames may be interpolated between measurements. As another example, an image acquisition system may not include a position log, an orientation log, and/or orientation sensors for positioning system 110. For instance, the primary data of interest may be the times of the audio marks. As a further example, an image acquisition system may not include a separate audio mark generator. For instance, controller 118 may include an audio board that is wired to video cameras 122 to output an audio signal (in analog or digital format) that is directly marked onto the audio tracks thereof.

Figure 3A:
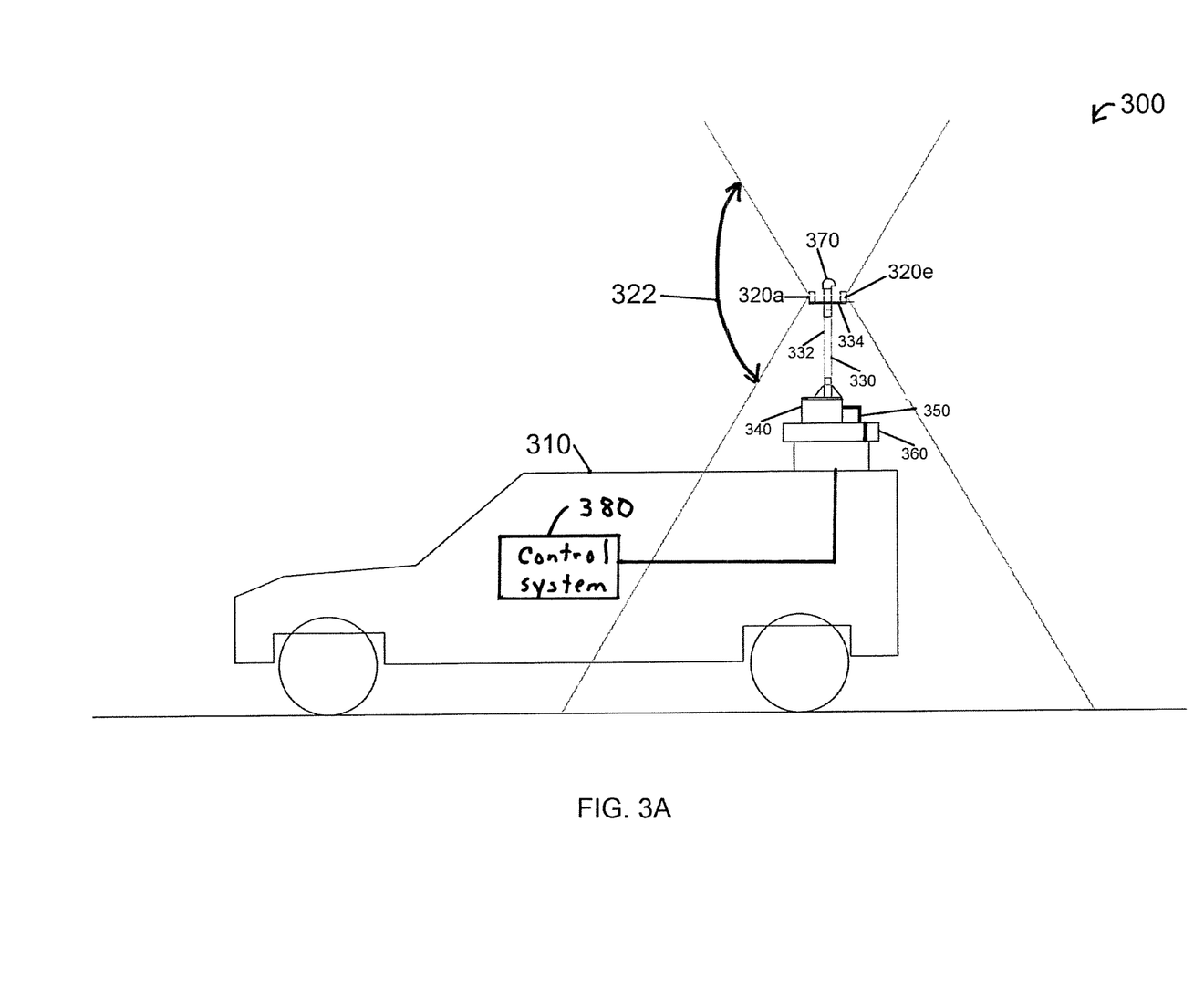
FIGS. 3A-C are schematic diagrams illustrating selected components of an example image acquisition system for mobile imaging.
Figure 3B:
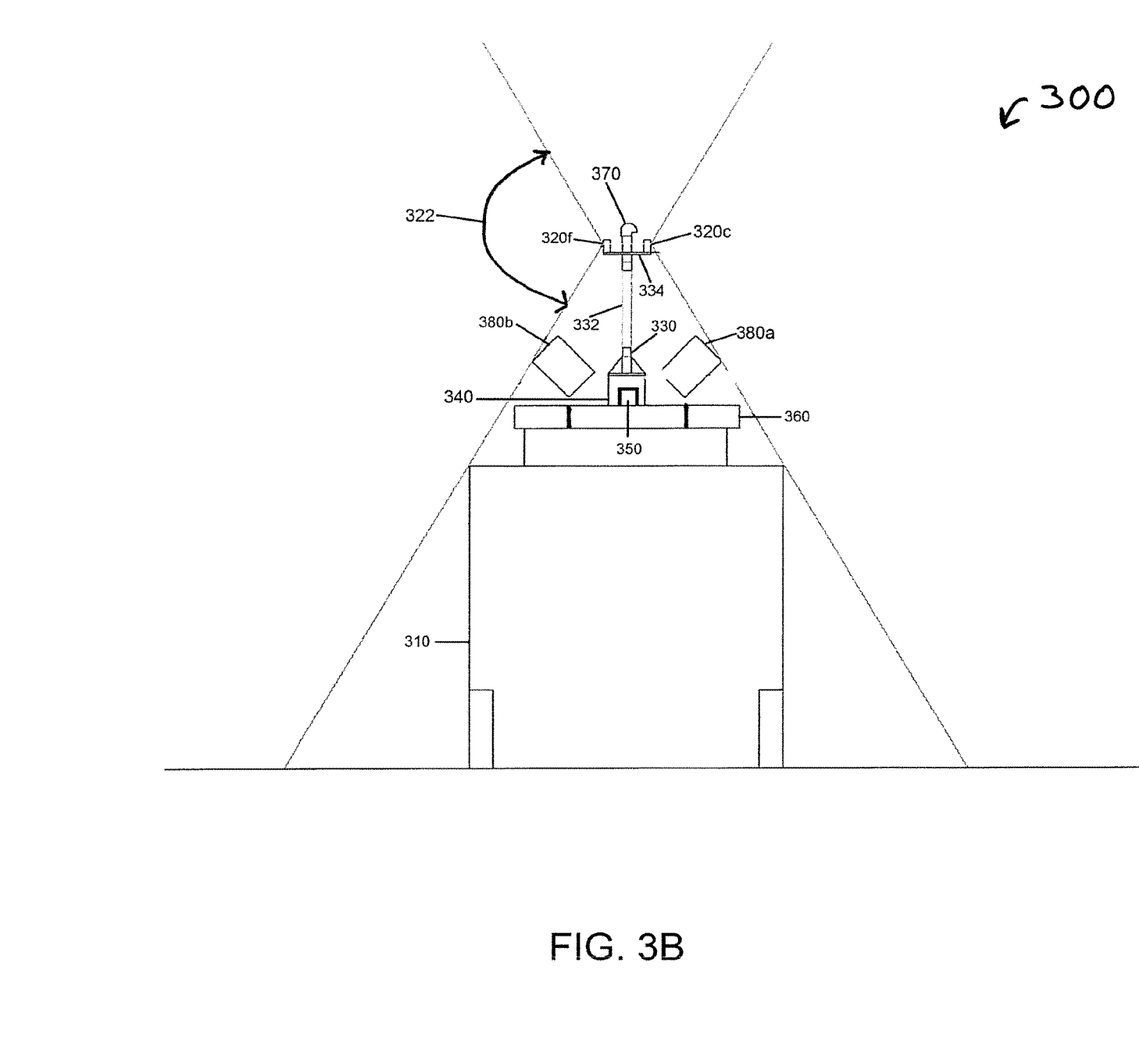
Figure 3C:
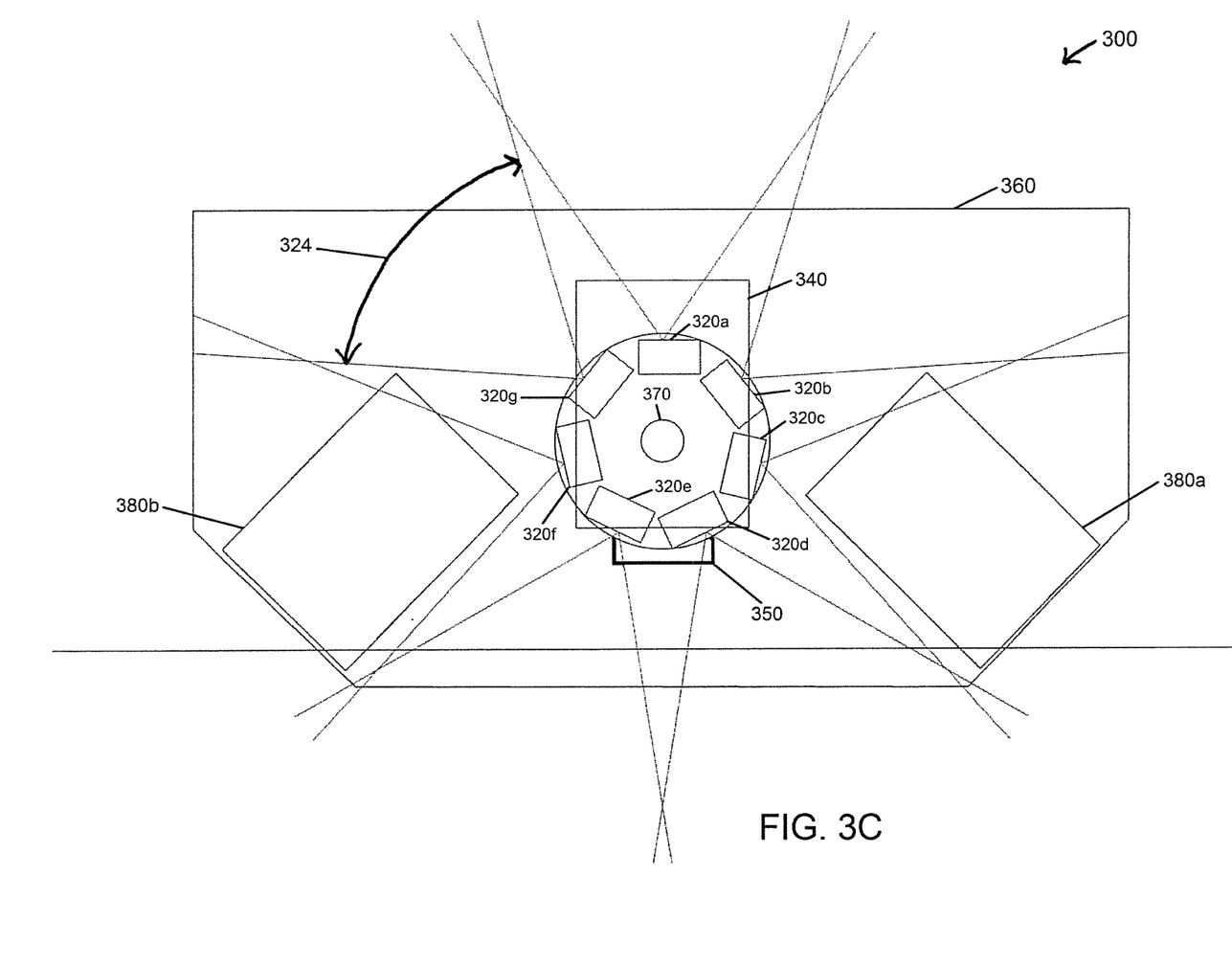

FIGS. 3A-C illustrate an example image acquisition system 300 for mobile imaging. As illustrated, system 300 includes a vehicle 310 upon which an array of video cameras 320 is mounted.

In the illustrated implementation, vehicle 310 is a wheeled vehicle. Vehicle 310 may, for example, be a sport utility vehicle or a van.

Mounted to the top of vehicle 310 is a base 360. Base 360 provides a platform upon which to mount certain components of the image acquisition system. At its bottom, base 360 is adapted to contour to the roof of vehicle 310, yet provide a flat surface for mounting components on its top.

On top of base 360 is a first positioning system 340 and a second positioning system 350. Positioning system 340 may, for example, be a Mobile Mapping System from Optech, and positioning system 350 may be a GPS-enabled Pixhawk. Also on top of base 360 are LIDAR sensors 380, which may be used for accurately measuring distance to surfaces and generating images thereof. Appropriate LIDAR sensors are, for example, available from Optech. LIDAR sensors 380 are not shown in FIG. 3A for clarity.

Mounted to the top of positioning system 340 is a platform 330. In general, platform 330 is designed to hold the video cameras in a rigid and repeatable fashion with minimal interference for the mobile mapping sensors, the GPS, the LIDAR sensors, and the cameras. Platform 330 includes a mast 332 and a base 334, upon which cameras 320 are mounted. Mast 332 may be sized to position cameras 320 at any appropriate height above the ground. In the illustrated implementation, mast 332 positions cameras 320 approximately 11.5 feet from the ground. Other heights may be used in other implementations, especially where the vertical field of view of the cameras is different. Base 334 is adapted to position the cameras 322 around mast 332 in a horizontal plane (e.g., on top of base 334). In the illustrated implementation, base 334 is adapted to have seven cameras mounted thereon. Other numbers of cameras may be used in other implementations. Base 334 may, for example, be a plate.

Cameras 320 have a vertical field of view 322, and a horizontal field of view 324. In the illustrated implementation, vertical field of view 322 is approximately 120 degrees, and the horizontal field of view 324 is approximately 70 degrees. In this implementation, the vertical field of views of the side cameras intersect the ground approximately 4 ft from the edge of the vehicle, and the vertical fields of view of the rear cameras intersect the ground approximately 5 feet from the center rear of the vehicle. The horizontal fields of view 324 overlap with each other to improve image integration. Other fields of view may be used in other implementations. Cameras 320 may, for example, store data on a Secure Digital (SD) card.

Cameras 320 may, for example, be Hero3 Black cameras from GoPro, Inc. The cameras may be mounted in GoPro Skeleton Cases, which may be installed in Genus Cages from Genus Tech of Kwai Chung, New Territories (Hong Kong). The cameras may be controlled by a GoPro WiFi remote. In certain implementations, the cameras may receive power from the batteries of vehicle 310.

At the top of mast 332 is an antenna 370. Antenna 370 receives a signal from GPS satellites and conveys it to positioning system 340 and positioning system 350.

Inside of vehicle 310 is a control system 380. Control system 380 is responsible for controlling the positioning systems 340, 350. For example, control system 380 may instruct the positioning systems to begin logging measurements and to activate an audio mark generator (not shown).

Although FIG. 3 illustrates an example system for mobile imaging, other systems for mobile imaging may include fewer, additional, and/or a different arrangement of components. For example, a system may include a digital video record for low grade storage. Additionally, a system may include a display (e.g., a monitor) for monitoring purposes. As another example, a system may include only one positioning system.

Figure 4:
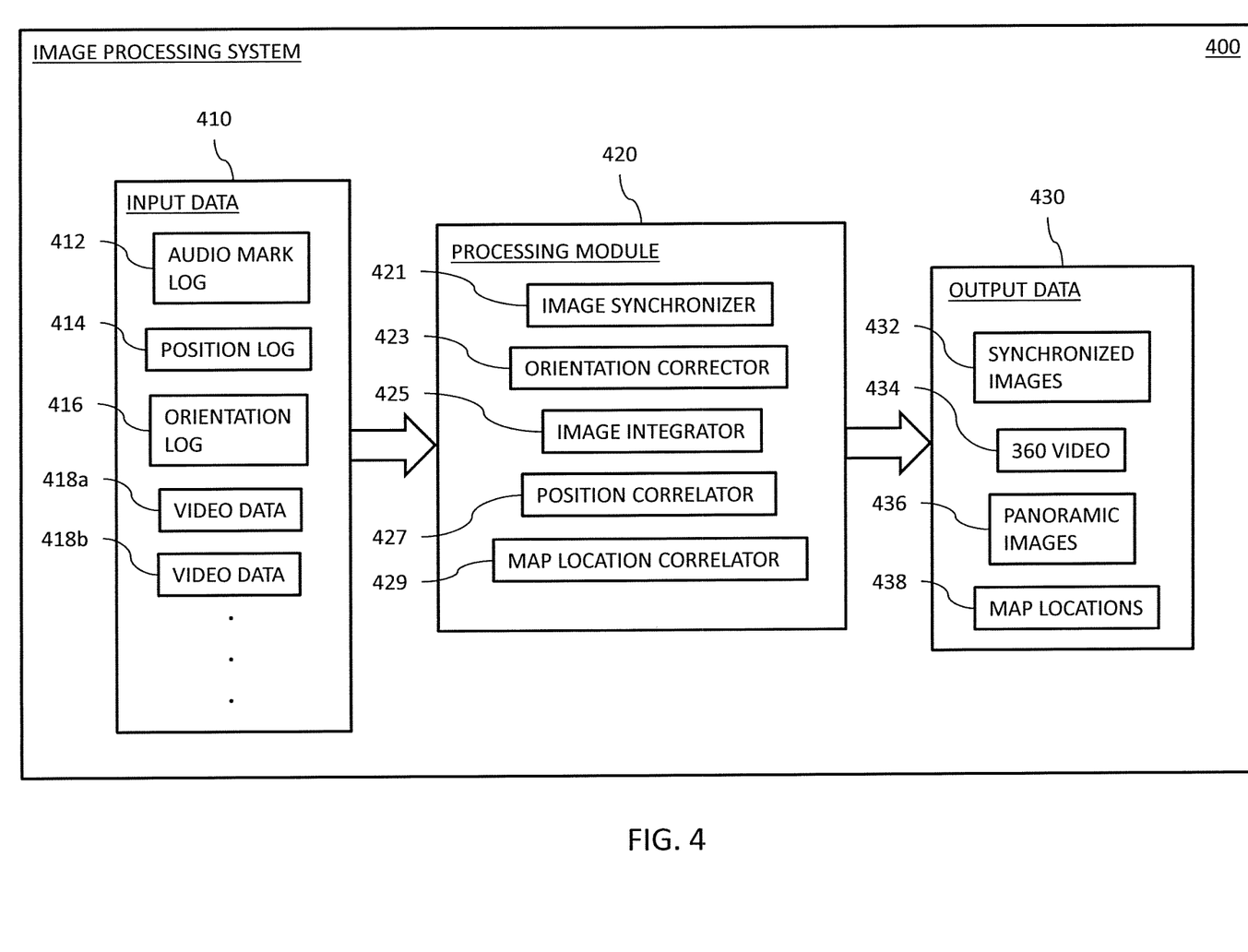
FIG. 4 is a block diagram illustrating selected components of an example image processing system for mobile imaging.

FIG. 4 illustrates an example image processing system 400 for mobile imaging. System 400 may, for example, cooperate with system 100 to produce enhanced mobile imaging. In general, system 400 receives input data 410 (e.g., image data) and generates synchronized, integrated images.

Input data includes an audio mark log 412, a position log 414, an orientation log 416, and video data 418 from a number of video cameras. The audio mark, position, and orientation logs and the video data may be downloaded from a system similar to system 100 (e.g., through a network interface controller or through a memory installation). The position log 414 and the orientation log 416 may be from the same positioning system that generated the audio mark log 412 or from another positioning system. In particular implementations, the log data may be in a single log.

To process input data 410, image processing system 400 includes a number of processing modules 420. Processing modules 420 include an image synchronizer 421, an orientation corrector 423, an image integrator 425, a position correlator 427, and a map location correlator 429.

Image synchronizer 421 is responsible for synchronizing image frames from different video cameras. The frames may, for example, be synchronized by analyzing audio tracks associated with video tracks for audio marks. When the same audio mark is found in the various audio tracks, the corresponding image frames may be associated with each other. The frames following the audio marks may be associated with each other based on the cameras' timing of the frames.

Orientation corrector 423 is responsible for correcting the orientation of the frames with respect to each other. As part of this, orientation corrector 440 may determine the orientation of the vehicle for each frame, which may be in orientation log 416, and correct it with respect to the vehicle's orientation.

Image integrator 425 is responsible for integrating frames from different cameras together. In particular implementations, image integrator 425 may, for example, perform image registration, image calibration and image blending.

Image registration may involve matching features in a set of images or using direct alignment methods to search for image alignments that minimize the sum of absolute differences between overlapping pixels. When using direct alignment methods, the image may first be calibrated to achieve improved better results. To estimate a robust model from the data, a method such as Random Sample Consensus (RANSAC) may be used. RANSAC is an iterative method for robust parameter estimation to fit mathematical models from sets of observed data points that may contain outliers. The algorithm is non-deterministic in the sense that it produces a reasonable result only with a certain probability, with this probability increasing as more iterations are performed.

Image calibration aims to minimize differences between an ideal lens model and the camera-lens combination that was used, optical defects such as distortions, exposure differences between images, vignetting, camera response, and chromatic aberrations. If feature detection methods were used to register images and absolute positions of the features were recorded and saved, image integration software may use the data for geometric optimization of the images in addition to placing the images on the panosphere.

Image blending involves executing the adjustments determined in the calibration stage, combined with remapping of the images to an output projection. Colors are adjusted between images to compensate for exposure differences. If applicable, high dynamic range merging may be performed along with motion compensation and deghosting. Images are blended together and seam line adjustment is performed to minimize the visibility of seams between images.

The seam can be reduced by a simple gain adjustment. This compensation is basically minimizing intensity difference of overlapping pixels. Image blending typically allots more weight to pixels near the center of the image. Gain compensated and multi-band blended images compare the best. Straightening is another method to rectify the image.

Even after gain compensation, some image edges may still be visible due to a number of unmodelled effects, such as vignetting (intensity decreases towards the edge of the image), parallax effects due to unwanted motion of the optical center, mis-registration errors due to mismodelling of the camera, radial distortion and so on. Due to these reasons, a multi-band blending may be used in some implementations.

Position correlator 427 correlates the position of one or more frames with a geographic position. The geographic positions may, for example, be extracted from a position log and associated with the frames based on marks in the audio track of the video data 456 and camera frame rates.

Map location correlator 429 is responsible for correlating the positions with map locations. As part of its operations, correlator 429 may transfer the geographic positions to map coordinates.

Output data 430 includes synchronized images 432, a 360 degree video 434, and panoramic images 436. Synchronized images 432 include frames from each video camera that have been identified as being taken at the same point (e.g., in time or space). This provides the ability to view a detailed image from each video camera at a specific point. 360 degree video 434 is the stitched-together video from the video cameras. This provides the ability to readily view an imaged route. Panoramic images 436 are frames at one point that have been stitched together.

In one mode of operation, image processing system 400 receives audio mark log 412, position log 414, orientation log 416, and video data 418 through a memory installation (e.g., insertion of a flash drive). Once the audio mark log 412, the position log 414, the orientation log 416, and the video data 418 had been received. Processing module 420 may, according to image synchronizer 421, correlate the frames in the video data from the different video cameras with each other. For example, the audio marks on the audio tracks may be analyzed to determine which audio marks correspond to each other. Once the corresponding audio marks have been determined, the associated video frames may be correlated with each other. For video frames that do not have an associated audio mark (e.g., frames that occur between audio marks), the frames may be associated with each other by beginning at the last known audio mark and moving forward using the cameras' timing. Additionally, an image timing list may be created using the audio marks. For frames that have an associated audio mark, the time may be determined from the audio mark log. For frames that do not have an associated audio mark, the times may be generated based on internal camera metrics (e.g., frame rates or timestamps) using the audio-marked frames as a reference.

Note that the frames from each camera may not be taken at exactly the same instance. For instance, if the cameras are recording video at 20 frames per second, the frame from two cameras that correspond to the same audio mark may actually be off in real time by up to 0.025, which translates to 1.7 ft. at 45 mph. However, this discrepancy should not make a material difference once the images are integrated together.

Processing module 420 may then correct the orientation of the images, under the direction of orientation corrector 423. For example, correcting the orientation may be accomplished by accessing orientation log 416 to adjust the orientation of an image relative to the neighboring images.

Processing module 420 may then integrate frames together, under the direction of image integrator 425. For example, processing module 420 may stitch the correlated frames together. This may generate a panoramic video.

Processing module 420 may then correlate each set of stitched frames with a position. For example, the processing unit may generate a time for each frame based on audio mark log 412. For frames that have an associated audio mark, the time will be known. For frames that occur between audio marks, the times may be determined based on frame speed or internal timing from the video cameras. Once the time for each frame is known, the frames may be correlated with positions based on position log 414. Position log 414 contains a number of positions associated with times. Some of the times in position log 414 may correspond to times for certain frames. Thus, the positions for these frames may be directly correlated with positions in position log 414. For frames that do not have times that correspond to times in position log, the positions may be interpolated based on positions in position log 414.

Processing module 420 may then correlate the positions with map locations using map location correlator 429.

In particular implementations, panoramic images 436 may be generated based on specific time or location criteria (e.g., every second or every 100 ft.). The panoramic images may be generated from a set of integrated frames.

Image processing system 400 may be implemented on one or more a computer systems. A computer system may, for example, include one or more processors (e.g., microprocessors), memory (random access memory, read-only memory, and disc memory), and input/output interfaces. Processing modules 420 may be applications, routines, or code segments that are executed on a processor.

Although FIG. 4 illustrates one example image processing system for mobile imaging, other image processing systems for mobile imaging may include fewer, additional, and/or a different arrangement of components. For example, some systems may not include an image synchronizer. In some implementations, image synchronization may be performed by hand, for instance. As another example, some systems may not include a map location correlator.

Figure 5:
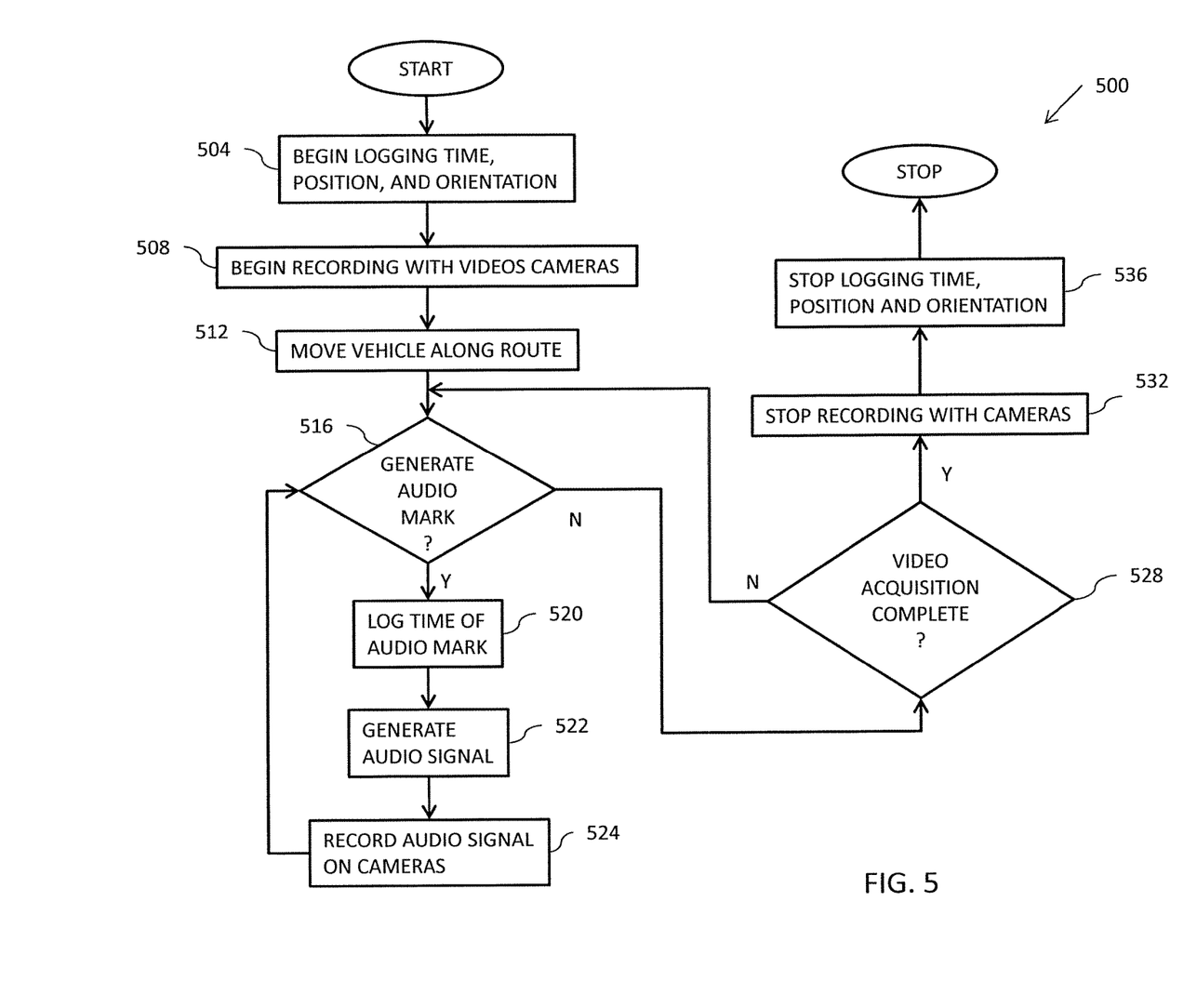
FIG. 5 is a flow diagram illustrating selected operations an example process for mobile imaging.

FIG. 5 illustrates an example process 500 for mobile imaging. Process 500 may, for example, be implemented by a system similar to system 100.

Process 500 calls for beginning to log times, positions, and orientations (operation 504). In particular implementations, the times and positions may be generated by a positioning system (e.g., a GPS system) and orientations may be made available from an inertial measurement system. Logging times, positions, and orientations may be performed by one or more positioning systems.

Process 500 also calls for beginning to record video data (e.g., image frames and audio) with a number of video cameras (operation 508). The cameras may, for example, be arranged in a circular manner in a horizontal plane, thereby providing a 360 degree coverage. Beginning to record video data with the cameras may, for example, be accomplished by activating the cameras.

Process 500 also calls for moving a vehicle along the route to be imaged (operation 512). Moving the vehicle along the route to be imaged may, for example, include beginning to move the vehicle or continuing to move the vehicle, but along the route. The vehicle may generally move along the route (e.g., roadway) at typical speeds, although it may stop if it needs to (e.g., for traffic or at stop signs). As the vehicle moves, the video cameras continue recording video data.

Process 500 additionally calls for determining whether an audio mark should be generated (operation 516). For example, an audio mark may be generated when the vehicle has moved a predesignated distance (e.g., 1000 m) or when a predesignated time has elapsed (e.g., 1 minute). These parameters may be input to a positioning system, which may make the determination.

If an audio mark should be generated, process 500 also calls for logging the time of the audio mark (operation 520).

Logging the time of the audio mark may, for example, be accomplished by inserting an entry in an audio mark log, which may indicate that an audio mark was generated at a particular time. Process 500 also calls for generating an audio signal (operation 522). The audio signal may, for example, be generated by a device that generates an audible sound or one that generates an audio signal for placement on the audio track of the video cameras (e.g., through a wired connection).

In certain implementations, generating an audio mark may include waiting for a time at which a GPS transceiver is making a GPS measurement and sending a command to an audio mark generator at that time. Because GPS measurements may be made at a fairly high frequency (e.g., 10 Hz), the delay in generating the audio mark may be minimal (e.g., 0.1 s).

Process 500 also calls for recording the audio signal on video cameras (operation 524). The audio signal may be recorded on the cameras by sensing an audible sound corresponding to the mark (e.g., through an on-camera microphone), converting the audible sound to data, and storing the data on an audio track.

Process 500 also calls for determining whether the video acquisition is complete (operation 528). Determining whether the video acquisition is complete may, for example, be accomplished by determining that a route has been completed (e.g., based on geographic position) or receiving an input from a user. If the video acquisition is not complete, process 500 calls for again determining whether an audio mark should be generated (operation 516). Process 500 may allow a number of audio marks to be generated and recorded by the cameras.

Once the video acquisition is complete, process 500 calls for stopping the recording with the video cameras (operation 532) and stopping the logging of the time, position, and orientation (operation 536). Process 500 is then at an end.

Although FIG. 5 illustrates an example process for mobile imaging, other processes for mobile imaging may include fewer, additional, and/or a different arrangement of operations. For example, a process may include generating one or more audio marks before moving the vehicle along the route. In particular implementations, for example, three audio marks may be generated before moving the vehicle along the route. These precursor audio marks may be generated manually, under instruction from an external control system, or in an automated fashion (e.g., based on movement of the vehicle). As another example, the vehicle may begin moving along the route before beginning to record with the cameras. As an additional example, the logging of the time, position, and orientation may continue after the cameras have stopped recording. As a further example, orientation data may not be recorded. A variety of operations may be performed in a contemporaneous or a simultaneous manner.

Figure 6:
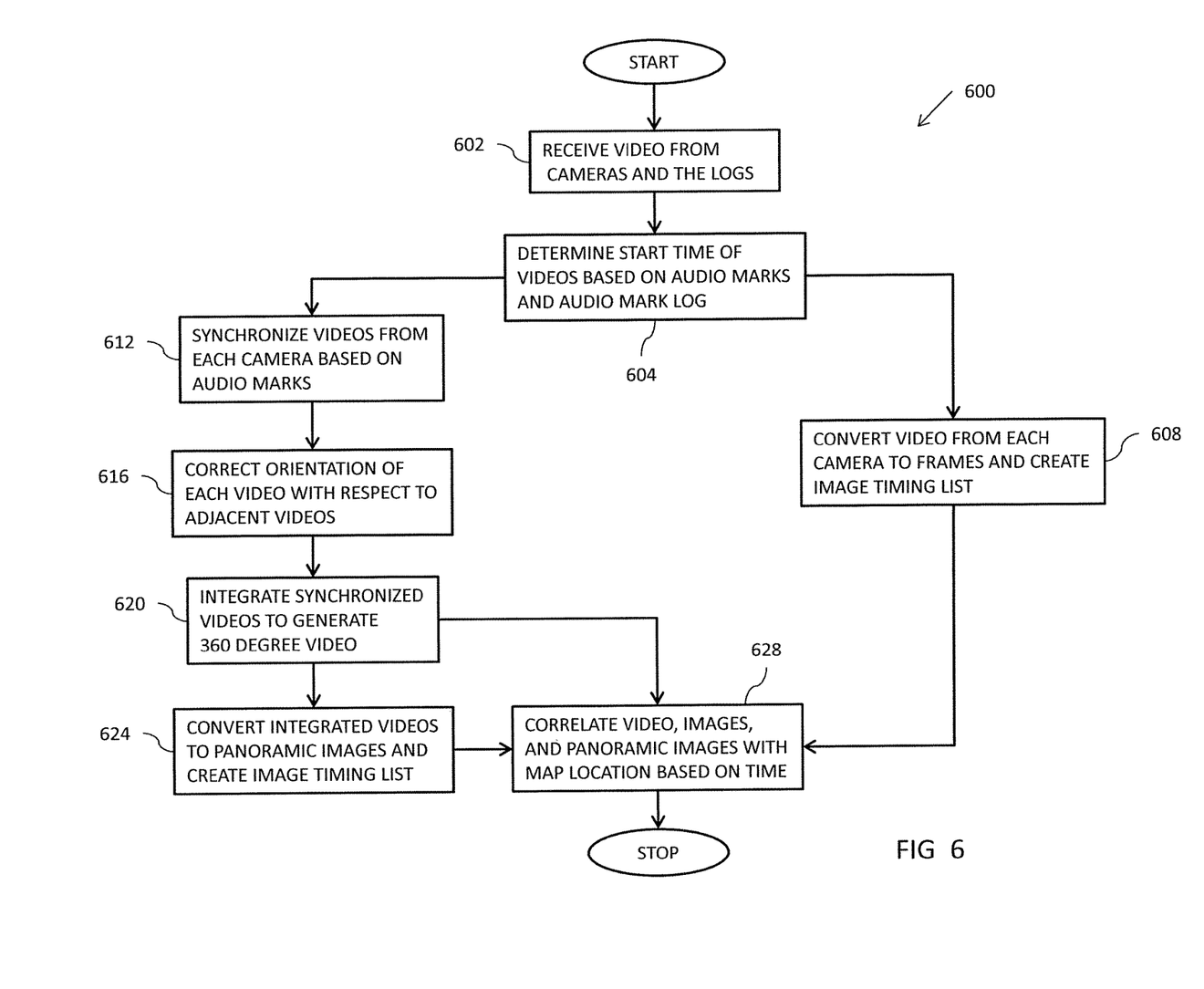
FIG. 6 is a flow diagram illustrating selected operations another example process for mobile imaging.

FIG. 6 illustrates another example process 600 for mobile imaging. Process 600 may, for example, be implemented by a system similar to system 400.

Process 600 calls for receiving video data from a number of video cameras and audio mark, position, and orientation logs (operation 602). The video data (e.g., image frames and audio) and the logs may be downloaded over a wired or wireless connection or read from an information carrier (e.g., a disk drive or a flash drive).

Process 600 also calls for determining the start time of the videos based on the audio marks in the audio tracks and the audio mark log (operation 604). The audio marks in the audio tracks should correspond to times in the audio mark log.

Process 600 also calls for converting video from each camera to frames and creating an image timing list (operation 608). The image timing list may be generated by using the frames that have associated audio marks, which should have associated times, as references and then using internal camera metrics (e.g., frame rate or timestamps) for frames that do not have associated audio marks.

Process 600 additionally calls for synchronizing the videos from each camera based on the audio marks (operation 612). Assuming each video camera is working properly, each audio track should have marks that correlate with each other. Synchronizing the videos may, for example, entail identifying corresponding audio marks on each audio track. Once corresponding audio marks on each video have been identified, the image frames from each video may be synchronized with each other (e.g., using frame rates or timestamps).

Note that the frames from each camera may not be taken at exactly the same instance. For example, if the cameras are recording video at 20 frames per second, the frame from two cameras that correspond to the same audio mark may actually be off in real time by up to 0.025 s, which translates to 1.7 ft. at 45 mph. However, this discrepancy should not make a material difference once the images are integrated together.

Process 600 also calls for correcting the orientation of each video with respect to adjacent videos (operation 616). Correcting the orientation may, for example, be accomplished by accessing an orientation log to adjust the orientation of each frame with respect to its neighboring frames.

Process 600 also calls for integrating the synchronized videos together to generate a 360 degree video (operation 620). Integrating the synchronized videos together may, for example, be accomplished by image registration, image calibration, and image blending of the synchronized frames.

Process 600 additionally calls for converting the integrated video to panoramic images and creating an image timing list (operation 624). The panoramic images may, for example, be generated based on specific time or location criteria (e.g., every second or every 100 ft.).

Process 600 also calls for correlating the 360 degree video, the images, and the panoramic images with map locations (operation 628). Because at least some of the frames are associated with times due to the audio marks, the frames may be correlated with positions from the position log. In certain implementations, the position log may have positions sampled at a higher rate than the video frames (e.g., 200 Hz versus 20 Hz). Thus, each frame may be directly associated with a unique position, assuming the vehicle did not stop. In other implementations, the position log may have positions sampled at a lower rate than the video frames (e.g., 2 Hz versus 30 Hz). The positions of frames that occur between position measurements may be interpolated.

Although FIG. 6 illustrates an example process for mobile imaging, other processes mobile imaging may include fewer, additional, and/or a different arrangement of operations. For example, a mobile imaging process may not include converting the video to frames and/or panoramic images. As another example, a mobile imaging process may not include correcting the orientation of the videos. As an additional example, a mobile imaging process may not include generating 360 degree video. A variety of operations may be performed in a contemporaneous of simultaneous manner.

Figure 7:
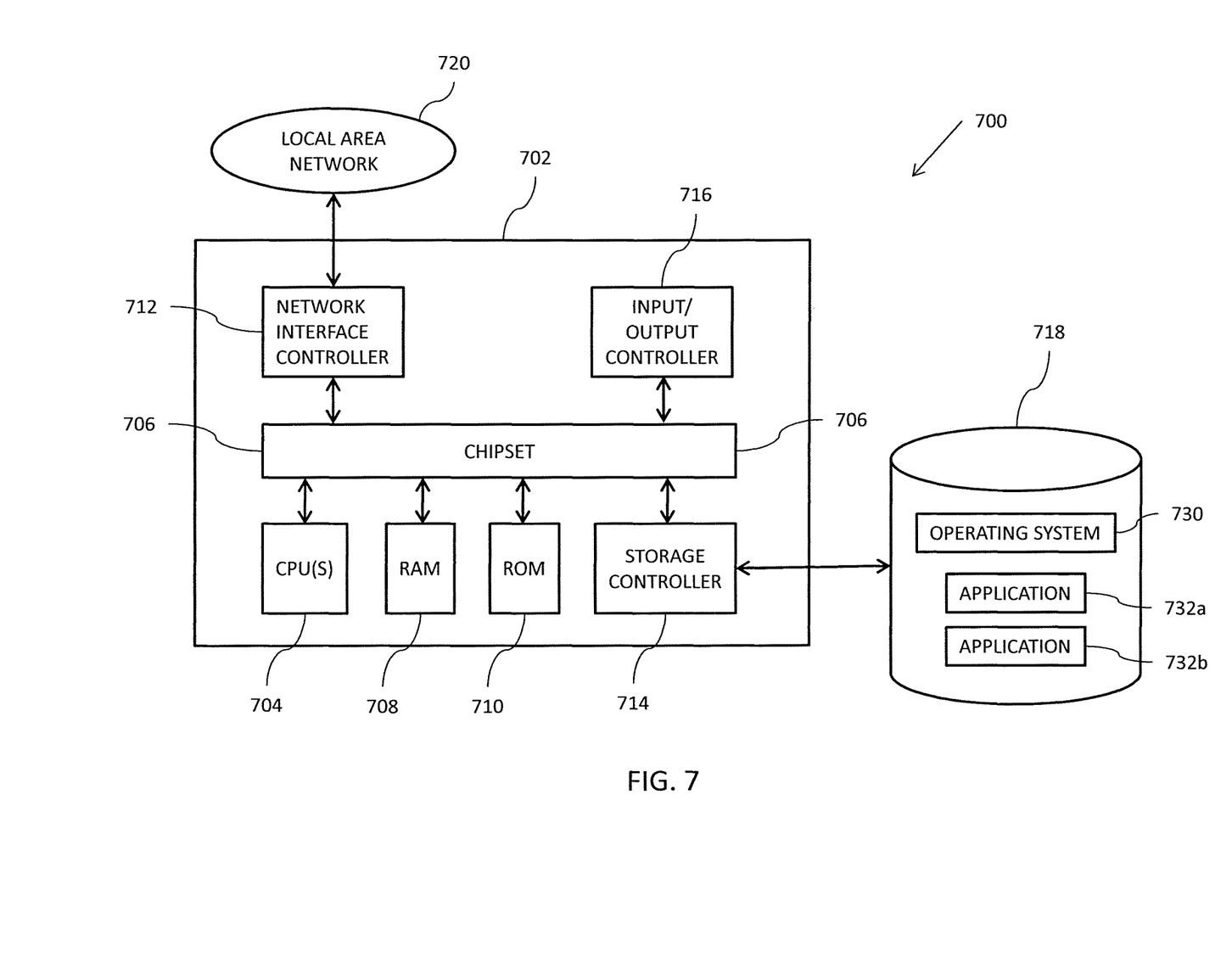
FIG. 7 is a block diagram illustrating selected components of an example computer system for mobile imaging.

FIG. 7 depicts an example computer system 700 capable of executing the above-described software components.

With regard to the example system described with respect to FIG. 1 and FIG. 4, the controller 118, the controller 144, and the image processing system 400 may each be implemented as a computer system 700.

The computer architecture shown in FIG. 7 may illustrate a conventional server computer, workstation, desktop computer, laptop, tablet, network appliance, PDA, e-reader, digital cellular phone or other computing node. The computer architecture may be utilized to execute any aspects of the software components presented herein described as executing on controllers or computer systems or on any other computing system mentioned herein.

Computer system 700 may include a baseboard, or "motherboard," which is a printed circuit board to which a multitude of components or devices may be connected by way of a system bus or other electrical communication paths. One or more central processing units ("CPUs") 704 may operate in conjunction with a chipset 706. CPUs 704 may be standard programmable processors that perform arithmetic and logical operations necessary for the operation of computer system 700.

CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 706 may provide an interface between CPUs 704 and the remainder of the components and devices on the baseboard. Chipset 706 may provide an interface to a random access memory ("RAM") 708 used as the main memory in computer system 700. Chipset 706 may further provide an interface to a computer-readable storage medium such as a read-only memory ("ROM") 710 or non-volatile RAM ("NVRAM") for storing basic routines that may help to start up computer system 700 and to transfer information between the various components and devices. ROM 710 or NVRAM may also store other software components necessary for the operation of computer system 700 in accordance with the embodiments described herein.

Computer system 700 may operate in a networked environment using logical connections to remote computing nodes and computer systems through network 720. Chipset 706 may include functionality for providing network connectivity through a network interface controller ("NIC") 712, such as a gigabit Ethernet adapter. NIC 712 may be capable of connecting the computer system 700 to other computing nodes over network 720. It should be appreciated that multiple NICs 712 may be present in computer system 700, connecting the computer to other types of networks and remote computer systems.

Computer system 700 may be connected to a mass storage device 718 that provides non-volatile storage for the computer. Mass storage device 718 may store system programs, application programs, other program modules and data which have been described in greater detail herein. Mass storage device 718 may be connected to computer system 700 through a storage controller 714 connected to chipset 706. Mass storage device 718 may consist of one or more physical storage units. Storage controller 724 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Computer system 700 may store data on mass storage device 718 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 718 is characterized as primary or secondary storage and the like.

For example, computer system 700 may store information to mass storage device 718 by issuing instructions through storage controller 714 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer system 700 may further read information from mass storage device 718 by detecting the physical states or characteristics of one or more particular locations within the physical storage units.

In addition to mass storage device 718 described above, computer system 700 may have access to other computer-readable storage media to store and retrieve information, such as program modules, data structures or other data. It should be appreciated by those skilled in the art that computer-readable storage media can be any available media that provides for the storage of non-transitory data and that may be accessed by computer system 700.

By way of example and not limitation, computer-readable storage media may include volatile and non-volatile, transitory and non-transitory, removable and non-removable media implemented in any method or technology. Computer-readable storage media includes but is not limited to, RAM, ROM, erasable programmable ROM ("EPROM"), electrically-erasable programmable ROM ("EEPROM"), flash memory or other solid-state memory technology, compact disk ROM ("CD-ROM"), digital versatile disk ("DVD"), high definition DVD ("HD-DVD"), BLU-RAY or other optical storage, magnetic cassettes, magnetic tape, magnetic disk storage, other magnetic storage devices or any other medium that can be used to store the desired information in a non-transitory fashion.

Mass storage device 718 may store an operating system 730 utilized to control the operation of the computer system 700. According to one embodiment, the operating system comprises a version of the LINUX operating system. According to another embodiment, the operating system comprises a version of the WINDOWS® SERVER operating system from the MICROSOFT Corporation. According to further embodiments, the operating system may comprise a version of the UNIX operating system. It should be appreciated that other operating systems may also be utilized. Mass storage device 718 may store other system or application programs and data utilized by computer system 700, such as image integrator 442, position correlator 444, video data 456, logs 450-454, and/or the other software and/or data components described above.

Mass storage device 718 or other computer-readable storage media may be encoded with computer-executable instructions, which, when loaded into computer system 700, transforms the computer from a general-purpose computing system into a special-purpose computer capable of implementing the embodiments described herein. These computer-executable instructions transform computer system 700 by specifying how CPUs 704 transition between states, as described above. Computer system 700 may have access to computer-readable storage media storing computer-executable instructions, which, when executed by computer system 700, may perform operating procedures depicted in FIGS. 5-6.

Computer system 700 may also include an input/output controller 716 for receiving and processing input from a number of input devices, such as a keyboard, a mouse, a touchpad, a touch screen, an electronic stylus or other type of input device. Similarly, input/output controller 716 may provide output to a display, such as a computer monitor, a flat-panel display, a digital projector, a printer, a plotter or other type of output device. It will be appreciated that computer system 700 may not include all of the components shown in FIG. 7, may include other components that are not explicitly shown in FIG. 7 or may utilize an architecture completely different than that shown in FIG. 7.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a computer system may include any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disk and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms. Furthermore, various additions, omissions, substitutions, and changes in the form of the methods and systems described herein will be readily apparent to those skilled in the art while still achieving mobile imaging. Thus, the scope of protected subject matter should be judged based on the following claims, which may encompass one or more aspects of one or more embodiments.

The invention claimed is:

1. A system for mobile imaging, the system comprising:
a vehicle;
a plurality of video cameras mounted on the vehicle, each video camera positioned to capture a different view relative to the vehicle and adapted to capture video data as the vehicle travels;
a global positioning system (GPS) transceiver located on the vehicle, the GPS transceiver generating position measurements and associated times, the times and positions being stored in one or more logs;
an audio mark generator located on the vehicle and adapted to generate an audio signal for recording in the video data of each video camera; and
a controller adapted to activate the audio mark generator a plurality of times as the vehicle travels and log the time for each activation;
wherein the controller is adapted to activate the audio mark generator at a user-specified travel time or distance.

2. The system of claim 1, wherein the video cameras are mounted on a platform located above the vehicle.

3. The system of claim 1, wherein the vehicle is an automobile.

4. The system of claim 1, wherein the controller is adapted to activate the audio mark generator based on distance traveled.

5. The system of claim 1, further comprising an image processing system comprising an electronic processor, the system adapted to:
receive the video data from each of the video cameras and the position and audio mark logs;
synchronize the video data from each camera based on the audio marks in the video data; and
integrate the synchronized video data to generate a 360 degree video.

6. The system of claim 5, further comprising orientation sensors, the orientation sensors adapted to determine the orientation of the vehicle as it travels, the orientation being stored in the one or more logs, wherein the image processing system is adapted to correct the orientation of each of the video cameras based on the orientation of the vehicle.

7. The system of claim 5, wherein the image processing system is further adapted to correlate the 360 degree video with map locations based on the position data and the audio marks.

8. The system of claim 5, wherein the image processing system is further adapted to convert the 360 degree video to panoramic images.

9. The system of claim 8, wherein the image processing system is further adapted to correlate the 360 degree video and the panoramic images with map locations.

10. The system of claim 5, wherein the image processing system is further adapted to convert the video data from each video camera to frames and create a frame timing list.

11. The system of claim 10, wherein the image processing system is further adapted to correlate the frames with map locations.

12. The system of claim 1, further comprising a second GPS transceiver located on the vehicle, the second GPS transceiver generating time measurements, wherein the controller uses the times from the second GPS transceiver for the audio mark log.

13. The system of claim 12, wherein the controller uses times from the second GPS transceiver to activate the audio mark generator.

14. A method for mobile imaging, the method comprising:
capturing video data with a plurality of video cameras mounted on a vehicle as the vehicle travels along a route, each video camera positioned to capture a different view relative to the vehicle and adapted to capture video data as the vehicle travels;
generating position measurements and associated times with a global positioning system (GPS) transceiver located on the vehicle, the times and positions being stored in one or more logs; and
generating a plurality of audio marks in the video data of each camera as the vehicle travels, based on a user-specified travel time or distance, and logging the time for each mark.

15. The method of claim 14, wherein generating the audio marks comprises generating the audio marks based on distance traveled.

16. The method of claim 14, further comprising:
receiving the video data from each of the cameras and the position and audio mark logs at an image processing system;
synchronizing the video data from each camera based on the audio marks in the video data; and
integrating the synchronized video data to generate a 360 degree video.

17. The method of claim 16, further comprising:
determining the orientation of the vehicle as it travels, the orientation being stored in the one or more logs; and
correcting the orientation of each of the video cameras based on the orientation of the vehicle.

18. The method of claim 16, further comprising correlating the 360 degree video with map locations based on the position data and the audio marks.

19. The method of claim 16, further comprising converting the 360 degree video to panoramic images.

20. The method of claim 19, further comprising correlating the 360 degree video and the panoramic images with map locations.

21. The method of claim 16, further comprising:
generating time measurements with a second GPS transceiver located on the vehicle; and
using the times from the second GPS transceiver for the audio mark log.

22. The method of claim 21, further comprising activating the audio mark generator based on the times from the second GPS transceiver.

* * * * *